(12) United States Patent　　(10) Patent No.:　US 12,670,894 B2

Hubert et al.　　(45) Date of Patent:　Jun. 30, 2026

(54) MULTI-LAYER PHASE MODULATION ACOUSTIC LENS

(71) Applicant: GE Precision Healthcare LLC, Waukesha, WI (US)

(72) Inventors: Alexis Hubert, Antibes (FR); Damian Wolff, Wels (AT); Giandonato Stallone, Nice (FR)

(73) Assignee: GE Precision Healthcare LLC, Waukesha, WI (US)

( * ) Notice: Subject to any disclaimer, the term of this patent is extended or adjusted under 35 U.S.C. 154(b) by 174 days.

(21) Appl. No.: 18/480,602

(22) Filed: Oct. 4, 2023

(65) Prior Publication Data

US 2025/0118284 A1　　Apr. 10, 2025

(51) Int. Cl.
　G10K 11/30　　(2006.01)
　G01S 7/521　　(2006.01)
(52) U.S. Cl.
　CPC ............. G10K 11/30 (2013.01); G01S 7/521 (2013.01)
(58) Field of Classification Search
　CPC ................................. G10K 11/30; G01S 7/521
　See application file for complete search history.

(56) References Cited

U.S. PATENT DOCUMENTS

| | | | | | |
|---|---|---|---|---|---|
| 4,445,380 | A | * | 5/1984 | Kaminski | G10K 11/30 367/150 |
| RE32,062 | E | * | 1/1986 | Samodovitz | G10K 11/30 367/150 |
| 5,041,849 | A | * | 8/1991 | Quate | G10K 11/30 347/46 |
| 2025/0118284 | A1 | * | 4/2025 | Hubert | G01S 7/521 |

FOREIGN PATENT DOCUMENTS

| | | | | | |
|---|---|---|---|---|---|
| AU | 8317124 | A | * | 1/1984 | |
| CN | 119770074 | A | * | 4/2025 | G01S 7/521 |

* cited by examiner

*Primary Examiner* — Daniel Pihulic

(74) *Attorney, Agent, or Firm* — SPQ IP LLC

(57)　　　　ABSTRACT

An ultrasonic probe lens comprising a lens body comprising a solid material extending outward from an optical lens axis to a periphery, an inner surface of the lens body, and an outer surface of the lens body. A thickness of the lens body as measured from the inner surface to the outer surface varies from an optical lens axis to the periphery such that the lens body is configured with an inner optical profile and an outer optical profile to phase modulate the ultrasonic waves incident upon the lens body to reduce reverberations.

19 Claims, 12 Drawing Sheets

200

202 — PROBE EMITS ULTRASONIC WAVES

204 — PROBE RECEIVES REFLECTIONS (ECHOS) OF ULTRASONIC WAVES

206 — PROBE CONVERTS ECHOS TO ELECTRICAL SIGNALS ACCORDING TO TRANSDUCER STRUCTURE

208 — PROBE SENDS ELECTRICAL SIGNALS TO ULTRASOUND MACHINE

210 — ULTRASOUND MACHINE PROCESSES THE ELECTRICAL SIGNALS INCLUDING BEAMFORMING TECHNIQUES AND DISPLAYS ULTRASOUND IMAGE

500

502 — INJECT LENS MATERIAL INTO MOLD HAVING DIMENSIONS TO PRODUCE A LENS HAVING AT LEAST ONE OF VARYING LENS THICKNESS AND INTERNAL LENS SURFACE TEXTURE

504 — ETCH INTERNAL LENS SURFACE TEXTURE OR LAMINATE/OVERMOLD AN ADDITIONAL LENS SURFACE TEXTURE LAYER TO THE INTERNAL LENS SURFACE

506 — INSERT MOLDED LENS INTO ULTRASOUND PROBE

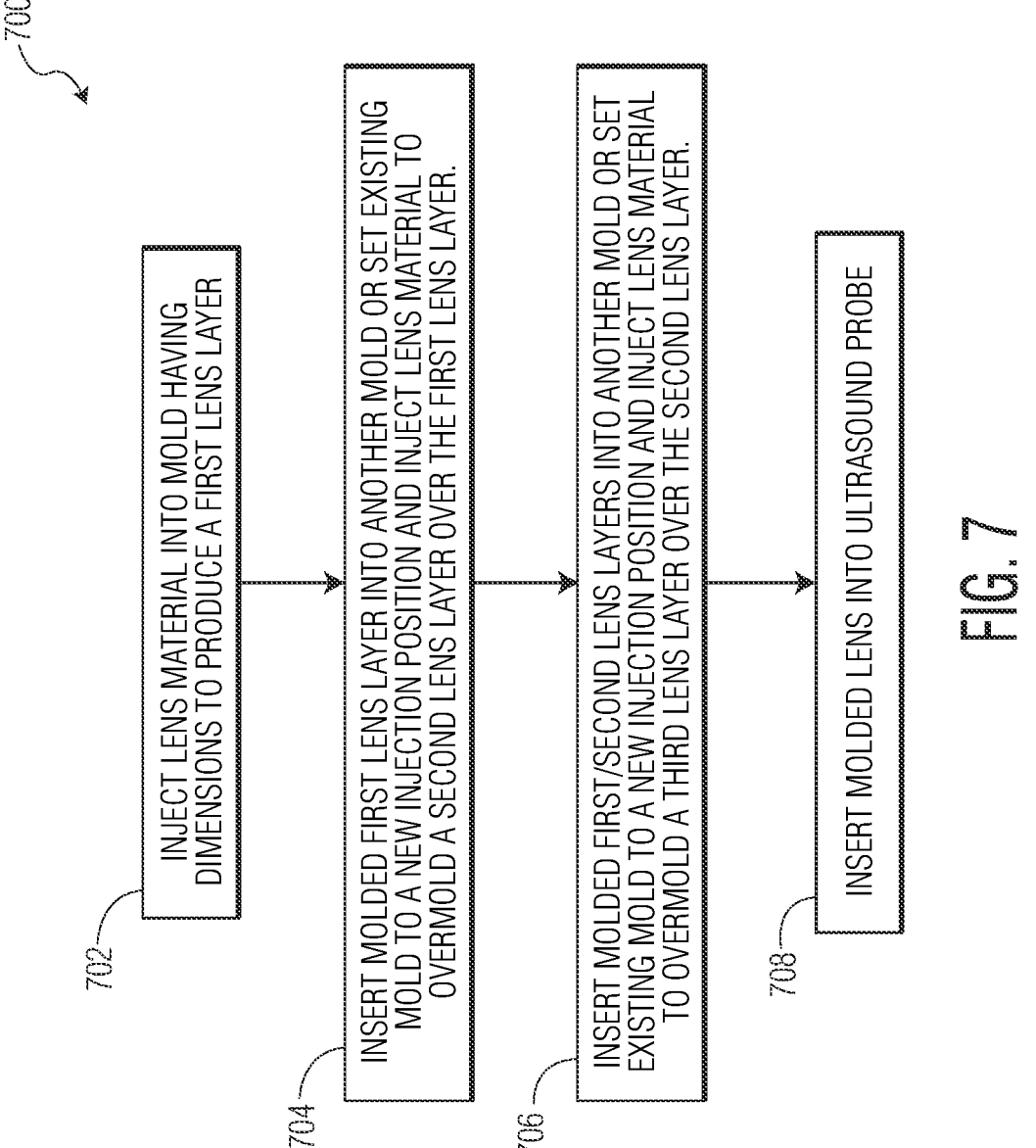

700

702 — INJECT LENS MATERIAL INTO MOLD HAVING DIMENSIONS TO PRODUCE A FIRST LENS LAYER

704 — INSERT MOLDED FIRST LENS LAYER INTO ANOTHER MOLD OR SET EXISTING MOLD TO A NEW INJECTION POSITION AND INJECT LENS MATERIAL TO OVERMOLD A SECOND LENS LAYER OVER THE FIRST LENS LAYER.

706 — INSERT MOLDED FIRST/SECOND LENS LAYERS INTO ANOTHER MOLD OR SET EXISTING MOLD TO A NEW INJECTION POSITION AND INJECT LENS MATERIAL TO OVERMOLD A THIRD LENS LAYER OVER THE SECOND LENS LAYER.

708 — INSERT MOLDED LENS INTO ULTRASOUND PROBE

FIG. 7

| | | | |
|---|---|---|---|
| T2 | T2 | T2 | T2 |
| T2 | T1 | T1 | T2 |
| T2 | T1 | T1 | T2 |
| T2 | T2 | T2 | T2 |

MULTI-LAYER PHASE MODULATION ACOUSTIC LENS

FIELD

A multi-layer phase modulation acoustic lens.

BACKGROUND

In recent years, ultrasound probes have been increasingly using hard-shell lens, composed of an external rigid shell and an internal layer of a softer elastomer facing the transducer array. These hard-shell lenses have shown advantages such as increased an improved chemical barrier, robustness and reliability, and reduction of high-frequency acoustic loss. However, use of hard-shell lens results in an increase in internal reflectivity (echoes) of signals within the probe (reverberation) which can create artifacts in the ultrasound image.

SUMMARY

In embodiments, the present disclosure relates to an ultrasonic probe lens comprising a lens body comprising a solid material extending outward from an optical lens axis to a periphery, an inner surface of the lens body, and an outer surface of the lens body. A thickness of the lens body as measured from the inner surface to the outer surface varies from an optical lens axis to the periphery such that the lens body is configured with an inner optical profile and an outer optical profile to phase modulate ultrasonic waves incident upon the lens body to reduce reverberations.

In embodiments, the outer surface of the lens body comprises a curved shape or a flat shape that varies the thickness of the lens body.

In embodiments, the inner surface of the lens body comprises a curved shape or a wedge shape that varies the thickness of the lens body.

In embodiments, the inner surface of the lens body comprises a custom shape that alternates between increasing and decreasing the thickness of the lens body.

In embodiments, the thickness of the lens body increases from the optical lens axis to the periphery of the lens body.

In embodiments, the thickness of the lens body decreases from the optical lens axis to the periphery of the lens body.

In embodiments, the lens body comprises dimensions from the optical lens axis to the periphery to reduce the reverberations of the ultrasonic waves in a field of view of a 1-dimensional (1D) ultrasonic transducer.

In embodiments, the lens body comprises dimensions from the optical lens axis to the periphery to reduce the reverberations of the ultrasonic waves in a field of view of a 2-dimensional (2D) ultrasonic transducer.

In embodiments, the inner surface of the lens body comprises a texture configured to reduce the reverberations of the ultrasonic waves.

In embodiments, the solid material between the inner surface of the lens body and the outer surface of the lens body is configured to produce an internal optical profile to reduce the reverberations of the ultrasonic waves.

In embodiments, the present disclosure relates to an ultrasonic probe comprising a lens body comprising a solid material extending outward from an optical lens axis to a periphery, and a transducer configured to emit ultrasonic waves through the lens body, receive reflected ultrasonic waves through the lens body and convert the received reflected ultrasonic waves to electrical signals for further processing. A thickness of the lens body as measured from an inner surface of the lens body to an outer surface of the lens body varies from an optical lens axis to the periphery such that the lens body is configured with an inner optical profile and an outer optical profile to phase modulate the received reflected ultrasonic waves incident upon the lens body to reduce reverberations.

In embodiments, the outer surface of the lens body comprises a curved shape or a flat shape that varies the thickness of the lens body.

In embodiments, the inner surface of the lens body comprises a curved shape or a wedge shape that varies the thickness of the lens body.

In embodiments, the inner surface of the lens body comprises a custom shape that alternates between increasing and decreasing the thickness of the lens body.

In embodiments, the thickness of the lens body increases from the optical lens axis to the periphery of the lens body.

In embodiments, the thickness of the lens body decreases from the optical lens axis to the periphery of the lens body.

In embodiments, the lens body comprises dimensions from the optical lens axis to the periphery to reduce the reverberations of the received reflected ultrasonic waves in a field of view of a 1-dimensional (1D) ultrasonic transducer or a 2-dimensional (2D) ultrasonic transducer.

In embodiments, the further processing includes processing the electrical signals to compensate for the phase modulation of the received reflected ultrasonic waves caused by the lens.

In embodiments, the inner surface of the lens body comprises a texture configured to reduce the reverberations of the received reflected ultrasonic waves.

In embodiments, the solid material between the inner surface of the lens body and the outer surface of the lens body is configured to produce an internal optical profile to reduce the reverberations of the received reflected ultrasonic waves.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 7 shows flowchart of manufacturing an acoustic lens with and interim lens profile and ultrasound probe, according to an example embodiment of the present disclosure.

FIG. 8 shows block diagram of a transducer array and corresponding time delays due to the acoustic lens, according to an example embodiment of the present disclosure.

DETAILED DESCRIPTION

Figure 1A:
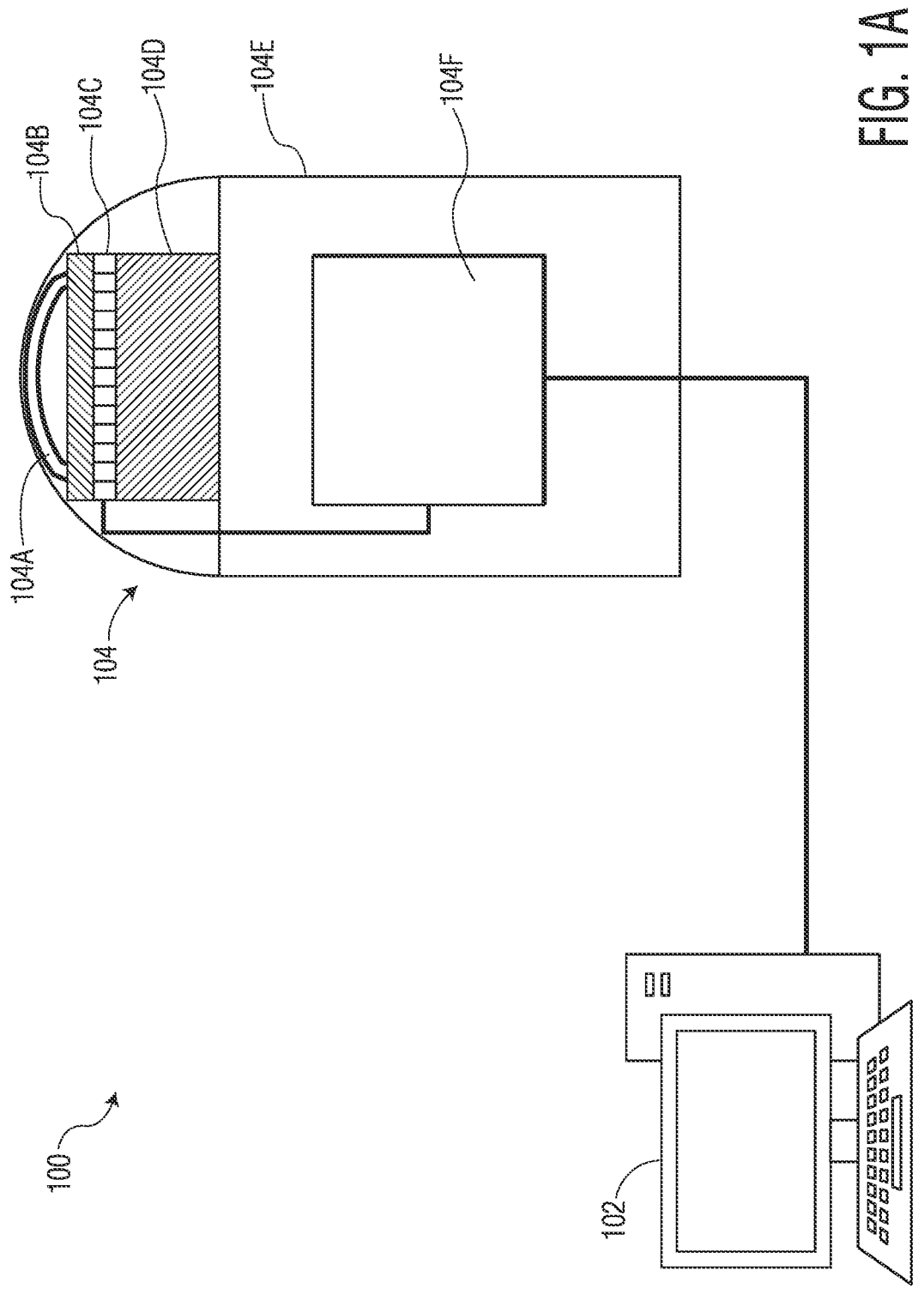
FIG. 1A shows a block diagram of an ultrasound machine, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

An ultrasound machine utilizes an ultrasound probe including an array of transducers having a field of view for emitting acoustic signals which reflect (echo) from anatomical structures and are received and processed to construct an image of the anatomical structures. Specifically, an ultrasound probe may include a 1-dimensional (1D) or 2-dimensional (2D) array of piezoelectric elements that are driven by electrical signals to vibrate to create the emitted acoustic wave. The array of piezoelectric elements then receives reflections (echoes) of the emitted acoustic wave. Upon receiving the echoes, the array of piezoelectric elements converts the acoustic wave to electrical signals which are then processed by the ultrasound machine to construct an image of the anatomical structure. The image may provide an image that depicts both distance of the anatomical structure to the transducer as well as density of the anatomical structure. Distance from the ultrasound probe to the anatomical structure is determined by the time it takes the emitted acoustic wave to be reflected (echoed) back and received by the ultrasound probe. Density of the anatomical structure may be determined by the intensity of the received reflected acoustic signals.

With the use of hard-shell ultrasonic probe lenses, acoustic reverberation may occur in an ultrasound probe when the received reflected waves bounce back and forth, for example, between the acoustic lens and other internal structures (e.g., probe shell, etc.) within the probe itself. The disclosed methods, devices and systems herein overcome the limitations of the existing ultrasound acoustic lenses by introducing a lens body having an optical profile that introduces phase modulation to the echo waves such that any reverberation signals deconstructively combine with one another to produce an attenuated reverberation within the probe. The lens body, for example, may achieve this phase modulation and the attenuated reverberation through the use of at least one of non-uniform lens thickness and textured lens surface. Signal processing techniques such as beamforming may also be implemented to compensate for the phase modulation introduced by the acoustic lens to maintain image accuracy. The transmitted and received wave are effectively realigned to avoid any degradation of image quality due to the phase modulation, such that only waves reflected in the probe are effectively attenuated to reduce reverberation. These features are described in more detail below.

Benefits of the disclosed methods, devices and systems described herein include but are not limited to attenuated reverberation in ultrasound probes thereby reducing unwanted artifacts and improving image quality (e.g., improved image contrast, reduction of artifacts, etc.). It is noted that although the lens solution is described herein with respect to use in an ultrasound probe, the lens solution would also be applicable in any other relevant acoustic application (e.g., sonar applications, etc.) where reverberation is problematic.

FIG. 1A shows a block diagram 100 of an ultrasound machine that includes computer 102 and ultrasound probe 104. Computer 102 may be a computer (e.g., personal computer) executing software for controlling the operation of ultrasound probe 104 and for converting and processing the received acoustic waves to generate and display the resultant ultrasound images. Ultrasound probe 104 may be any type of ultrasound probe (e.g., linear, curvilinear, phased array, 1D, 2D, etc.) including internal components housed in an outer shell 104E. These internal components may include acoustic lens 104A, acoustic matching layer 104B, acoustic transducer 104C, backing material 104D and electrical circuit 104F. It is noted that in another example, computer 102 may be a handheld device (e.g., smartphone, tablet, etc.) for processing the converted acoustic waves to generate and display the resultant ultrasound images. In yet another example, ultrasound probe 104 may be a standalone device having a processor and supportive hardware/software for converting and processing the received acoustic waves to generate and display resultant ultrasound images.

During operation, computer 102, executing software, controls electrical circuit 104F in a transmit mode to drive transducer 104C to vibrate and emit acoustic waves from the probe. The signals are emitted through acoustic matching layer 104B and acoustic lens 104A. After the acoustic waves are emitted, computer 102 controls electrical circuit 104F in a receive mode to turn off transducer 104C and wait for reflected acoustic waves (echoes). The echoes (e.g., reflected from the anatomical structure) enter the probe via acoustic lens 104A and acoustic matching layer 104B before being received by transducer 104C. Each portion of the transducer array 104C vibrates according to the portion of the echoes incident upon the transducer array elements thereby producing electrical signals having amplitudes proportional to the intensity of the echoes. These electrical signals are then transmitted from electrical circuit 104F back to computer 102 for further processing. For example, computer 102 creates an image (e.g., 2-dimensional image) based on the timing and intensity between the transmitted/received waves. This ultrasound image is then displayed to the ultrasound technician.

Figure 1B:
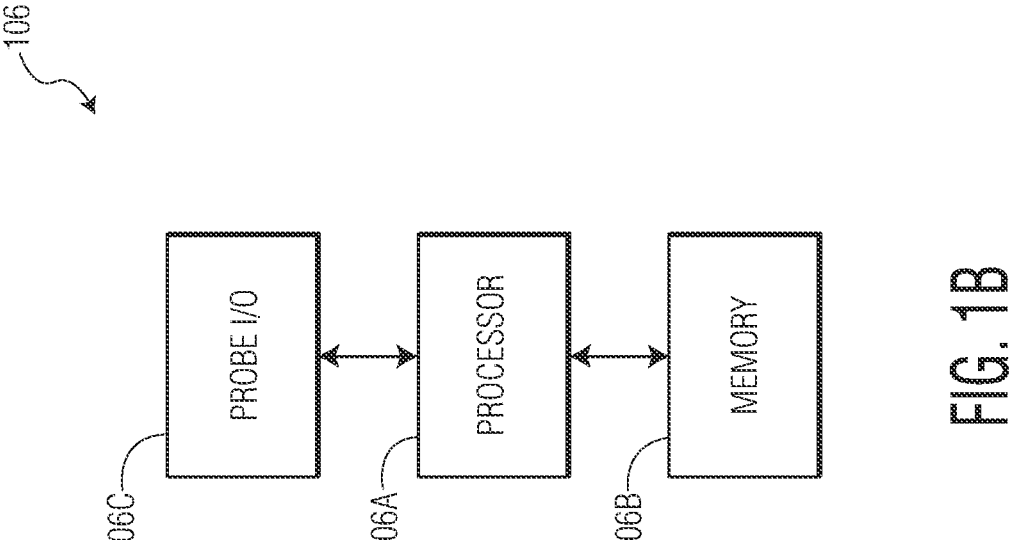
FIG. 1B shows a block diagram of the hardware of the ultrasound machine, according to an example embodiment of the present disclosure.

FIG. 1B shows a block diagram 106 of the hardware of computer 102. In this example, computer 102 may include a processor 106A, memory 106B and ultrasound probe input/output (I/O) circuitry 106C. During operation, processor 106A executes computer software stored in memory 106B. This computer software may be software for controlling the ultrasound probe and for creating ultrasound images. For example, upon executing the ultrasound software, processor 106A may send instructions (e.g., electrical signals, etc.) to the ultrasound probe via ultrasound probe I/O circuitry 106C (e.g., electrical port, etc. for communicating with the ultrasound probe). These control signals may control the ultrasound probe to emit and receive ultrasound waves which are then converted to electrical signals sent back to processor 106A via ultrasound probe I/O circuitry 106C for further processing to produce the ultrasound image.

Figure 2:
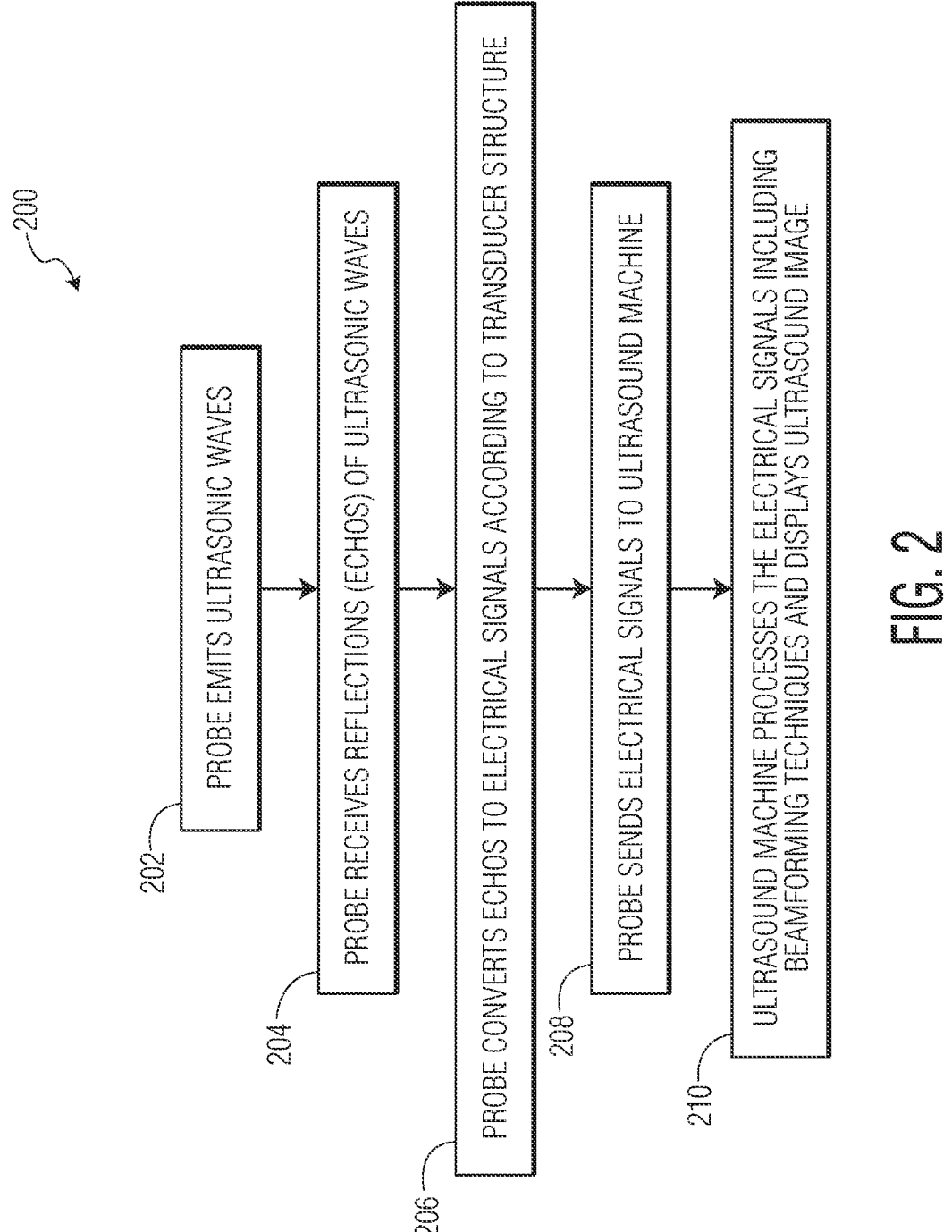
FIG. 2 shows a flowchart of operation of the ultrasound machine, according to an example embodiment of the present disclosure.

For sake of clarity, FIG. 2 shows a flowchart 200 of operation of the ultrasound machine. In step 202, computer 102 controls ultrasound probe 104 to emit ultrasonic waves. In step 204, ultrasound probe 104 receives echoes reflected from the target object (e.g., anatomical structure). In step 206, ultrasound probe 104 converts the received echoes to electrical signals. For example, each transducer element in the array will vibrate with an intensity correlated to the intensity of the portion of the acoustic wave incident upon the transducer element. In step 208, ultrasound probe 104 sends the electrical signals to computer 102 for further processing. In step 210, computer 102 processes the electrical signals according to ultrasound software to produce an ultrasound image which may be in greyscale or in color. Again, this processing may include analyzing the timing/intensity of the electrical signals and correlating the timing/intensity to distance/density of anatomical features which are displayed in images with varying contrast and/or color.

As mentioned above, acoustic reverberation may occur within an ultrasound probe when the echoes bounce back and forth, for example, between the acoustic lens and other internal structures within the probe, thereby producing unwanted artifacts that degrade image quality. The disclosed methods, devices and systems herein overcome the limitations of the existing ultrasound acoustic lenses by introducing a lens body having an optical profile (inner (i.e., internal) optical profile and an outer (i.e., external) optical profile) that introduces phase modulation (time delays) to different portions of the echoes such that any reverberation waves deconstructively combine with one another to produce attenuated reverberation.

Figure 3A:
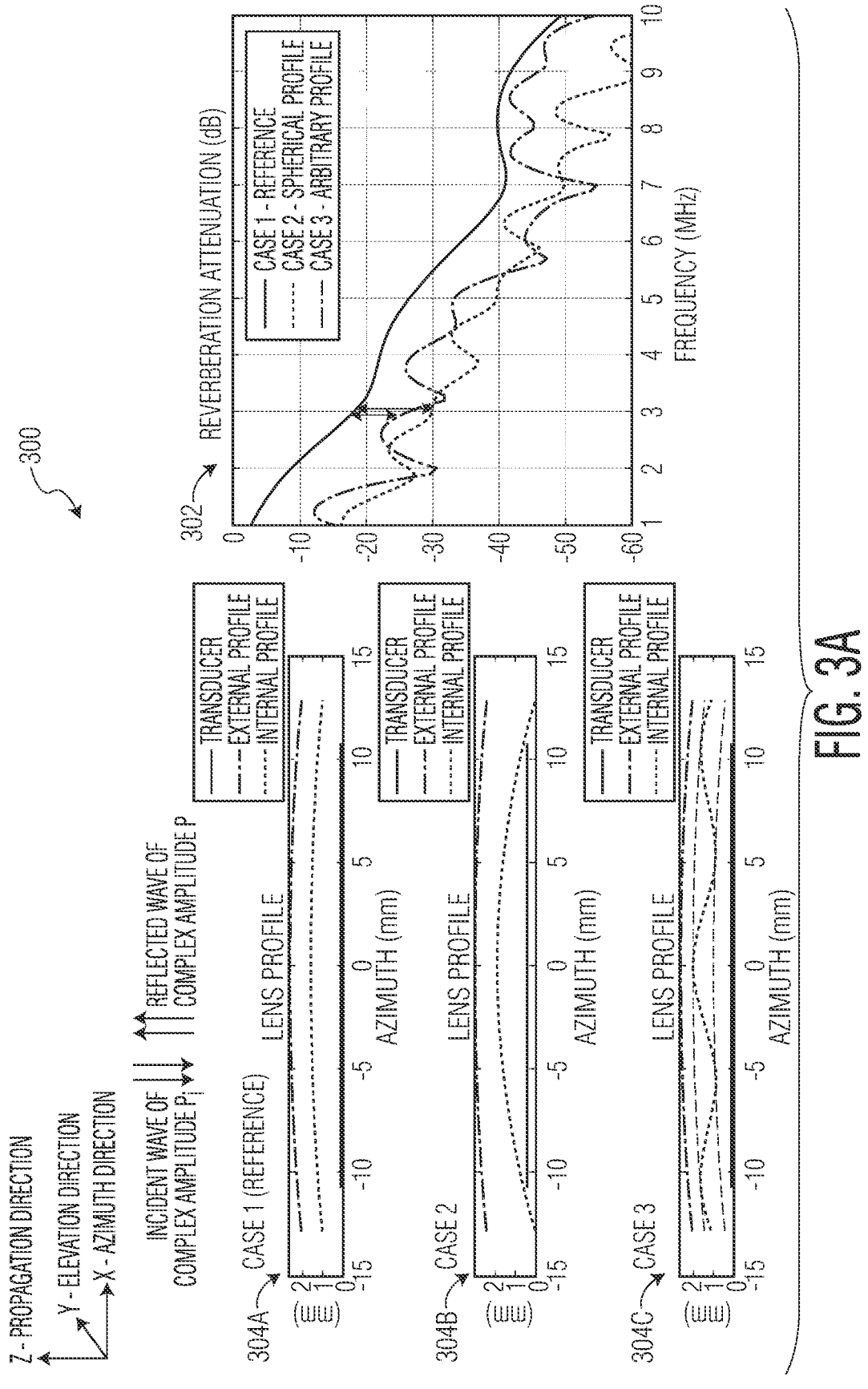
FIG. 3A shows data plots of signal attenuation for various acoustic lens profiles, according to an example embodiment of the present disclosure.

For example, FIG. 3A shows data plots 300 of signal attenuation for various acoustic lens profiles. Profile 304A is an acoustic lens profile of a lens having uniform thickness between the internal surface and external surface as the lens extends from the optical lens axis (0 mm azimuth) to the periphery. Profile 304A may be used as a reference profile since it does not introduce phase modulation (different time delays) to the to the echoes. In contrast, profile 304B is an acoustic lens profile of a lens having varied (increasing) thickness between the internal surface and external surface as the lens extends from the optical lens axis (0 mm azimuth) to the periphery (i.e., the periphery of the lens is thicker than the center of the lens). In addition, profile 304C is also an acoustic lens profile of a lens having a custom varied (oscillating) thickness between the internal surface and external surface as the lens extends from the optical lens axis (0 mm azimuth) to the periphery (i.e., the thickness of the lens oscillates between thick and thin profiles). Lens thickness varies according to one or more parameters. For example, lens thickness may vary with lens size (e.g., width/length/radius, etc.) such that the thickest part of the lens is a factor (e.g. 3×-5×) greater than the thinnest part of the lens. As shown, for example in profile 304B of FIG. 3A, the inner lens surface curves away from the outer lens surface as the lens extends from the center optical lens axis (0 mm azimuth) to the periphery, such that the factor increases from 1× at the center to greater than 2× at the periphery (12.5 mm azimuth). The rate at which the factor increases may also depend on the lens material, lens shape and other parameters such as the distance of the lens to the probe transducer.

In the case of the lens having profile 304A, echoes enter the lens and reverberate according to Case 1 in attenuation plot 302, whereas the lens having profile 304B and the lens having profile 304C have echoes that reverberate according to Case 2 and Case 3 respectively in attenuation plot 302. It is evident from attenuation plot 302 that Case 2 and Case 3 have improved reverberation attenuation as compared to Case 1. This improvement is due to the varying thickness between the internal surface and external surface in acoustic lens profiles 304B and 304C which facilitates phase modulation (different time delays) for different portions of the echoes.

Acoustic lenses may be constructed from various solid materials. These materials may include hard materials that support acoustic transmission such as plastics including but not limited to polymethylpentene (PMP) which is a thermoplastic polyolefin. One type of PMP could be poly (4-methyl-1-pentene) referred to as TPX®. Presuming that the lens is constructed of a uniform material, phase modulation is primarily attributed to the acoustic signal travel distance through the lens material. Specifically, the lens material provides an acoustic medium that has a slower acoustic speed than other mediums such as air. Thus, portions of the acoustic wave that travel through more lens material (i.e., travel through the thicker portions of the lens) will be time delayed relative to the portions of the acoustic wave that travel through less lens material (i.e., travel through the thinner portions of the lens).

As mentioned above, in Case 1, phase modulation does not occur because the portions of the acoustic wave travels through the same amount of lens material regardless of point of incidences on the lens (i.e., the portion of the wave incident upon the center of the lens travels through the same amount of lens material as the portion of the wave incident upon the periphery of the lens). However, in Case 2 and Case 3, phase modulation occurs because the portions of the acoustic wave travel through different amounts of lens material depending on the point of incidence on the lens. For example, in Case 2, portions of the acoustic wave incident upon the periphery of the lens will be phased delayed compared to portions of the acoustic wave incident upon the center of the lens.

The varying thickness between the internal surface and external surface in the acoustic lens profiles 304B and 304C are specifically chosen based on the frequency of the acoustic signals, the structure of the probe and other factors such that the resultant phase modulation ensures that reverberation waves deconstructively combine thereby attenuating any reverberation internal to the probe. For Case 2, the external lens profile (Equation 1) and internal lens profiles (Equation 2) describe the shape of the internal and external surfaces of the lens, obtained time delay (Equation 3) describes a time delay (i.e., phase modulation) obtained for a given point of the lens surface, coherent specular reflected wave (Equation 4) describes the echo, and coherent reflected wave attenuation (Equation 5) describes the attenuation on the echo due to the phase modulation. These equations are shown below in reference to Table 1:

$$z_1(x, y) = \sqrt{R_1^2 - x^2 - y^2} - R_1 + d_1 \qquad \text{Equation 1}$$

$$z_2(x, y) = \sqrt{R_2^2 - x^2 - y^2} - R_2 + d_2 \qquad \text{Equation 2}$$

$$\Delta t(x, y) = \frac{z_2}{v_2} + \frac{(z_1 - z_2)}{v_1} + \frac{(d_1 - z_1)}{v_0} \qquad \text{Equation 3}$$

$$P = \frac{P_i}{S} \int \int_S e^{2i \cdot \omega \cdot \Delta t} dx \, dy \qquad \text{Equation 4}$$

$$\alpha = \left| \frac{P}{P_i} \right| \qquad \text{Equation 5}$$

TABLE 1

| Param | Denomination |
|---|---|
| $d_1$ | Z-coordinate of external surface at apex |
| $d_2$ | Z-coordinate of internal surface at apex |
| $R_1$ | External radius of curvature |
| $R_2$ | Internal radius of curvature |
| $v_0$ | Sound speed in propagation medium |
| $v_1$ | Speed of sound in lens medium 1 |
| $v_2$ | Speed of sound in lens medium 2 |
| $z_1$ | External lens profile |
| $z_2$ | Internal lens profile |

Here the spherical internal profile creates a varying thickness of the shell both across the azimuth and elevation directions. The induce phase modulation can be compensated by beamformer to avoid degradation of image quality while echo waves on the probes are largely attenuated.

Figure 3B:
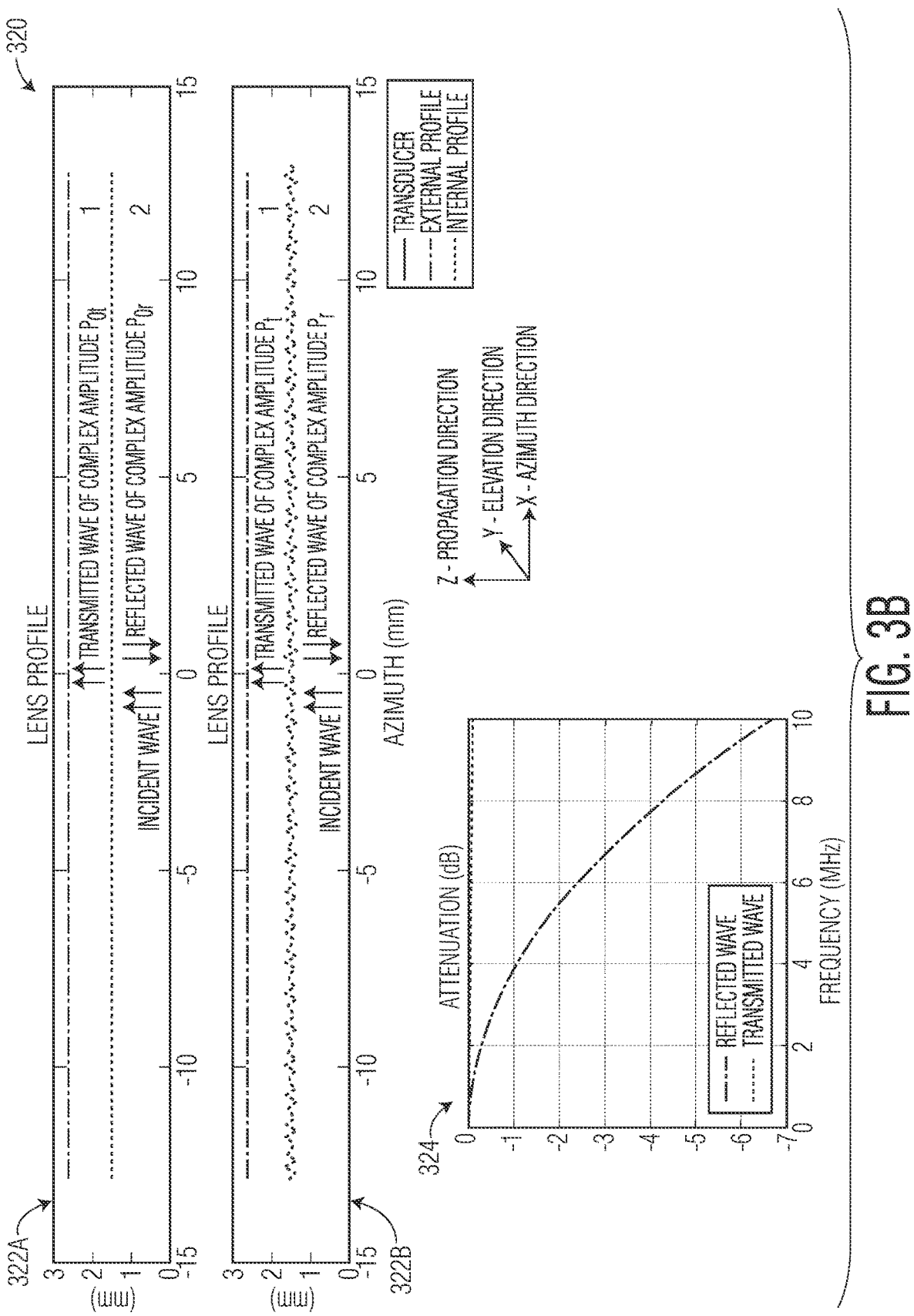
FIG. 3B shows data plots of signal attenuation for various acoustic lens profiles, according to an example embodiment of the present disclosure.

Although FIG. 3A shows data plots 300 of signal attenuation for varying thickness acoustic lens profiles, reverberation attenuation may also be achieved with uniform thickness lens by adding a texture to one or more of the lens surfaces. For example, FIG. 3B shows data plots 320 of reverberation attenuation for uniform acoustic lens profiles. Specifically, profile 322A shows an acoustic lens profile of a uniform thickness lens with smooth internal and external surfaces, whereas profile 322B shows an acoustic lens profile of a uniform thickness lens having a textured internal surface. As shown in data plot 324, the reverberation attenuation performance of the uniform thickness lens with a textured inner surface outperforms the reverberation attenuation performance of the uniform thickness lens with smooth surfaces. This is due to phase modulation of the echoes as a result of the textured surface. Specifically, the textured surface produces different time delays for different portions of the acoustic wave depending on the angle of the textured surface relative to the portion of the incident acoustic wave. The external and internal lens profile with roughness (Equation 6) describe the shape of the internal and external surfaces of the lens with added roughness, obtained phase modulation due to roughness (Equation 7) describes a time delay (i.e., phase modulation) obtained for a given point of the lens surface due to the roughness, effective root means-squared roughness (Equation 8) describes the roughness of the lens, and attenuation of the transmitted and reflected waves (Equation 9 and Equation 10) attenuation on the transmitted wave and echo due to the phase modulation. These equations are shown below in reference to Table 2:

$$z_2(x, y) = d_2 + \zeta(x, y) \qquad \text{Equation 6}$$

$$\phi_r(x, y) = -2\zeta(x, y)k_2 \qquad \text{Equation 7}$$

$$\zeta_m = \frac{1}{S} \int \int_S \zeta^2(x, y) dx \, dy \qquad \text{Equation 8}$$

$$\alpha_r = \left| \frac{P_r}{P_{0r}} \right| = e^{-2\zeta_m^2 k_2} \qquad \text{Equation 9}$$

$$\alpha_t = \left| \frac{P_t}{P_{0t}} \right| = e^{-\frac{1}{2}\zeta_m^2(k_2 - k_1)} \qquad \text{Equation 10}$$

TABLE 2

| Param | Denomination |
|---|---|
| $d_2$ | Z-coordinate of internal profile |
| $\zeta$ | Roughness profile |
| $\zeta_m$ | Effective roughness (rms) |
| $k_1$ | Wave number in lens medium 1 |
| $k_2$ | Wave number in lens medium 2 |
| $z_2$ | Internal lens profile |

Figure 4A:
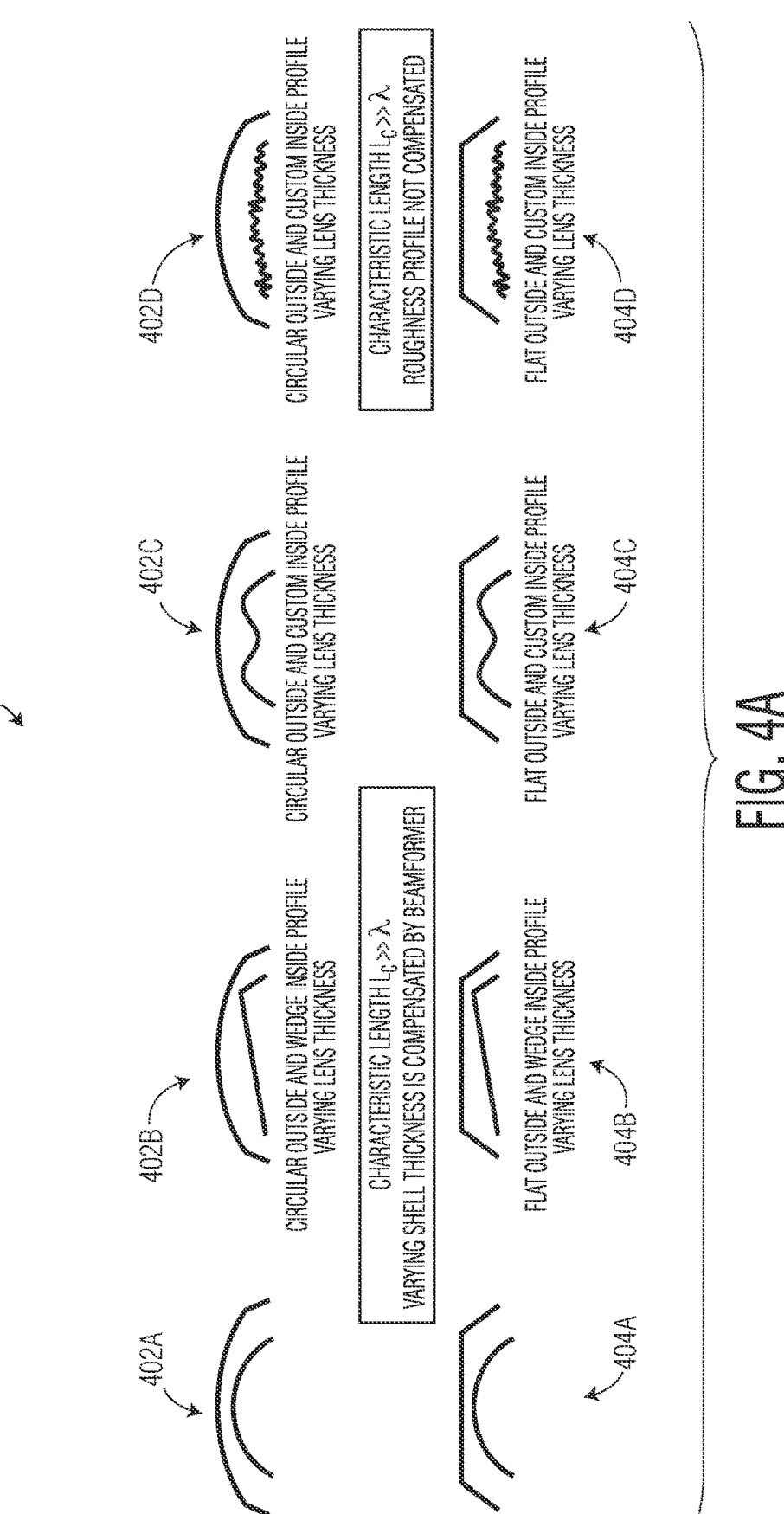
FIG. 4A shows elevation views of various acoustic lens profiles for a 2D probe, according to an example embodiment of the present disclosure.
Figure 4B:
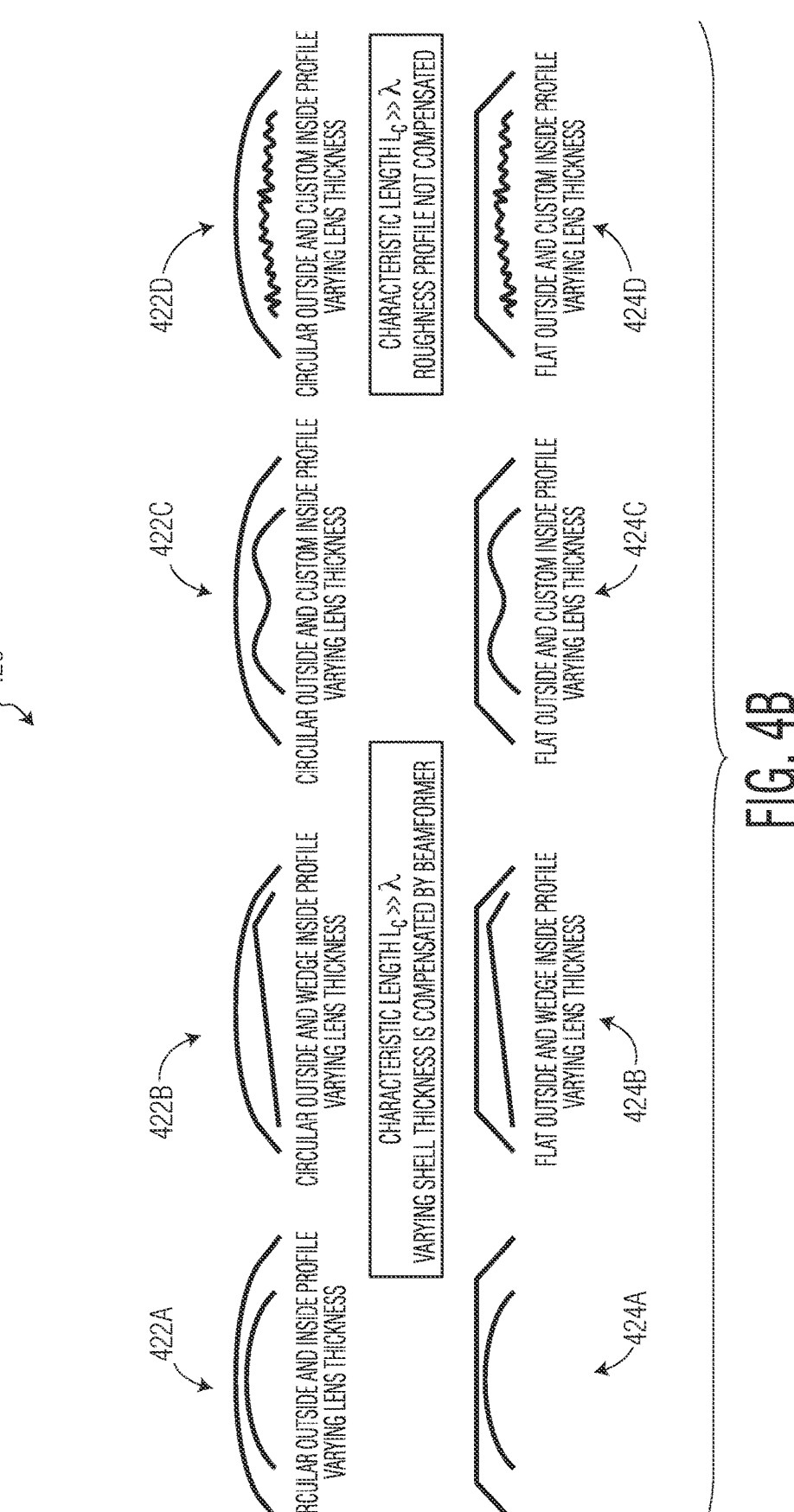
FIG. 4B shows azimuth views of various acoustic lens profiles for a 2D probe, according to an example embodiment of the present disclosure.
Figure 4C:
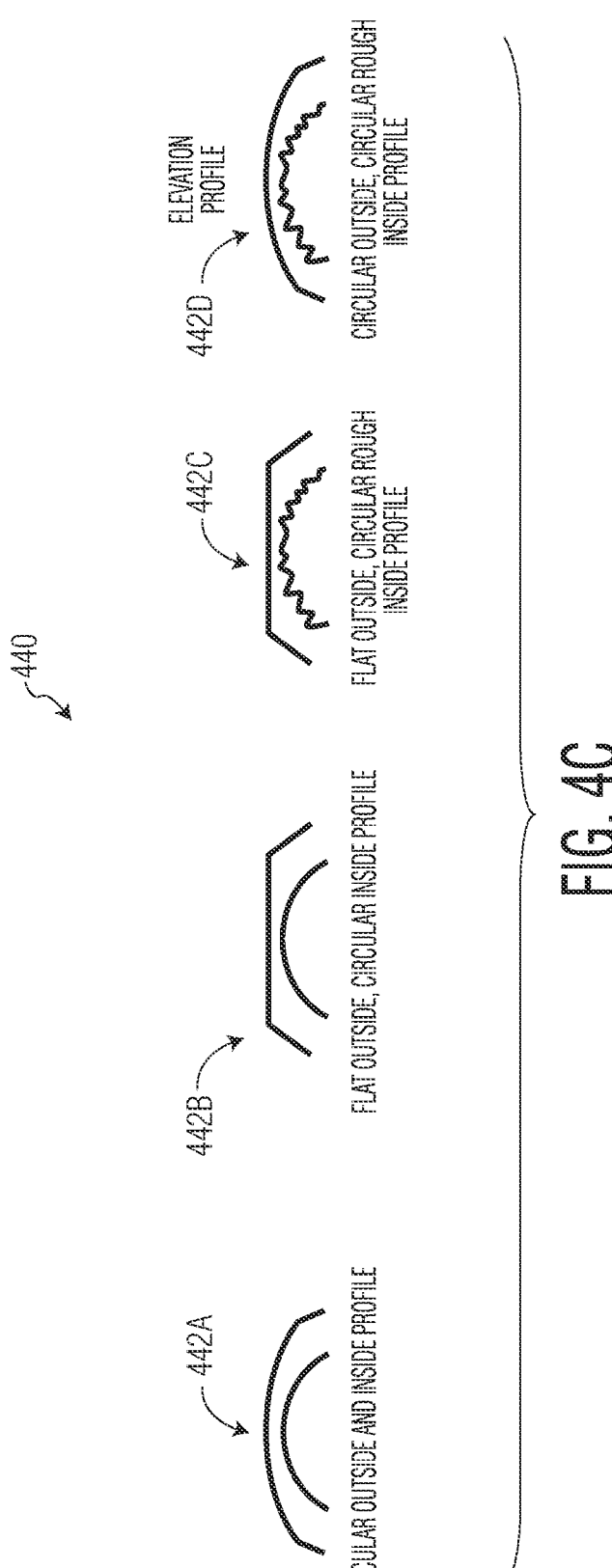
FIG. 4C shows elevation views of various acoustic lens profiles for a 1D probe, according to an example embodiment of the present disclosure.

As mentioned above, phase modulation may be achieved by varying the thickness of the acoustic lens, adding a texture to the acoustic lens surface or a combination of both. Examples of textures include but are not limited to random textures/patterns achieved via random blasting techniques (e.g., electro-discharge machining creating random electrical discharges) to randomly remove material from the acoustic lens surface while randomly leaving other lens material intact. Of course, rather than removing material, textures/patterns may be achieved by random deposition of additional material on the lens surface. The texture may achieve a desired roughness (e.g., 33-45) on a roughness scale such as the known VDI3400 scale. The shapes of the resultant textured surface may be sharp and/or rounded valleys/peaks in the lens surface. FIGS. 4A, 4B and 4C (described below) show various configurations for acoustic lenses having varying thicknesses and textures. It is noted that although round (i.e., curved) and flat profile lenses are shown in FIGS. 4A, 4B and 4C, other lens profiles are possible as long as at least one of the lens thickness varies and the surface has a texture to introduce phase modulation of the echoes as they enter the probe.

FIG. 4A shows elevation views 400 of various acoustic lens profiles for a 2D probe (i.e., probe with a 2D transducer array). Profiles 402A-402D show views of acoustic profiles for round acoustic lenses, while profiles 404A-404D show views of profiles for flat acoustic lenses. Specifically, profiles 402A and 404A are lens profiles having a lens thickness that symmetrically increases from the center of the lens to the periphery of the lens, profiles 402B and 404B are lens profiles having a lens thickness that asymmetrically increases from one side of the lens to the opposite side of the lens forming a wedge, profiles 402C and 404C are lens profiles having a lens thickness that oscillates across the length of the lens, and profiles 402D and 404D are lens profiles having a uniform lens thickness and textured inner lens surface.

FIG. 4B shows azimuth views 420 of the various acoustic lens profiles in FIG. 4A. Specifically, profiles 422A-422D show lens profiles of the round acoustic lenses in FIG. 4A, while profiles 424A-424D show profiles of the flat acoustic lenses in FIG. 4A. Specifically, profiles 422A and 424A are lens profiles having a lens thickness that symmetrically increases from the center of the lens to the periphery of the lens, profiles 422B and 424B are lens profiles having a lens thickness that asymmetrically increases from one side of the lens to the opposite side of the lens, profiles 422C and 424C are lens profiles having a lens thickness that oscillates across the length of the lens, and profiles 422D and 424D are lens profiles having a uniform lens thickness and textured inner lens surface.

The lens profiles in FIGS. 4A and 4B are for a 2D probe. However, the lens profiles described herein are also applicable to 1D probes. For example, FIG. 4C shows elevation views 440 of various acoustic lens profiles for a 1D probe. Profile 442A is a lens profile having a round lens having a thickness that symmetrically increases from the center of the lens to the periphery of the lens. Profile 442B is a lens profile having a flat lens having a thickness that symmetrically increases from the center to the periphery of the lens. Profile 442C is a lens profile having a flat lens having a thickness that symmetrically increases from the center to the periphery of the lens and includes a textured inner lens surface. Profile 442D is a lens profile having a round lens having a thickness that symmetrically increases from the center to the periphery of the lens and includes a textured inner lens surface.

It is noted that various lens profiles are possible by varying the thickness of the lens relative center and periphery of the lens, adding textures to one or more surfaces of the lens or a combination of both techniques. When adding textures to the lens surfaces, it may be beneficial to add the textures to the inner surface of the lens, especially in an ultrasound probe where external textures may be uncomfortable for the patient. It should also be noted that it may be beneficial for the textures to have a non-periodic pattern, to avoid interfering with the primary signals in the operation range of the ultrasound probe. In other words, it may be beneficial for the textures to be applied in a pseudo-random manner to produce a white frequency response that will add phase modulation while not adversely interfere with the acoustic signals. If the texture is applied in a periodic manner, care should be taken to ensure that the frequency response of the texture does not adversely interfere with primary frequencies of the acoustic signals. For example, the period of the texture pattern could be set at a frequency higher or lower than the operating band of the acoustic signals used by the probe.

Figure 5:
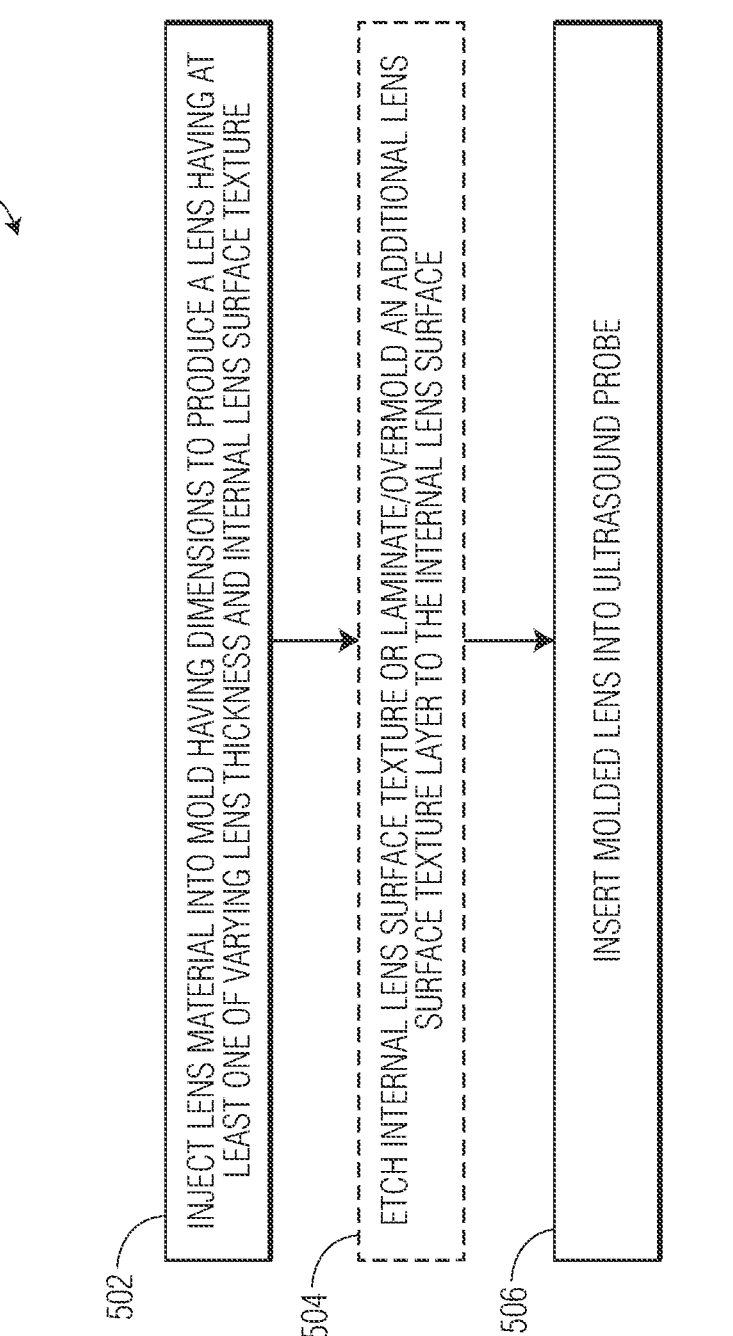
FIG. 5 shows a flowchart of manufacturing an acoustic lens and ultrasound probe, according to an example embodiment of the present disclosure.

The acoustic lenses described above may be manufactured using various techniques including molding, layered lamination, 3D printing and the like. In one example, FIG. 5 shows a flowchart 500 of manufacturing an acoustic lens and ultrasound probe using molding techniques. In step 502, lens material may be injected into a mold having dimensions to produce a lens having at least one of varying lens thickness and an internal lens surface texture. Optionally, rather than molding the lens with the texture in a single step, the lens may be molded with a smooth surface and then the texture may be added through etching the smooth lens surface or laminating/overmolding additional lens layers including texture in step 504. Once the lens is molded it can be inserted and secured in the housing of the ultrasound probe in step 506. Regardless of the manufacturing technique selected, the resultant lens may have a varying thickness, textured surface or a combination of both in order to introduce a predetermined phase modulation to the acoustic signals that result in reverberation signals deconstructively combining to attenuate any reverberation present in the probe.

Figure 6:
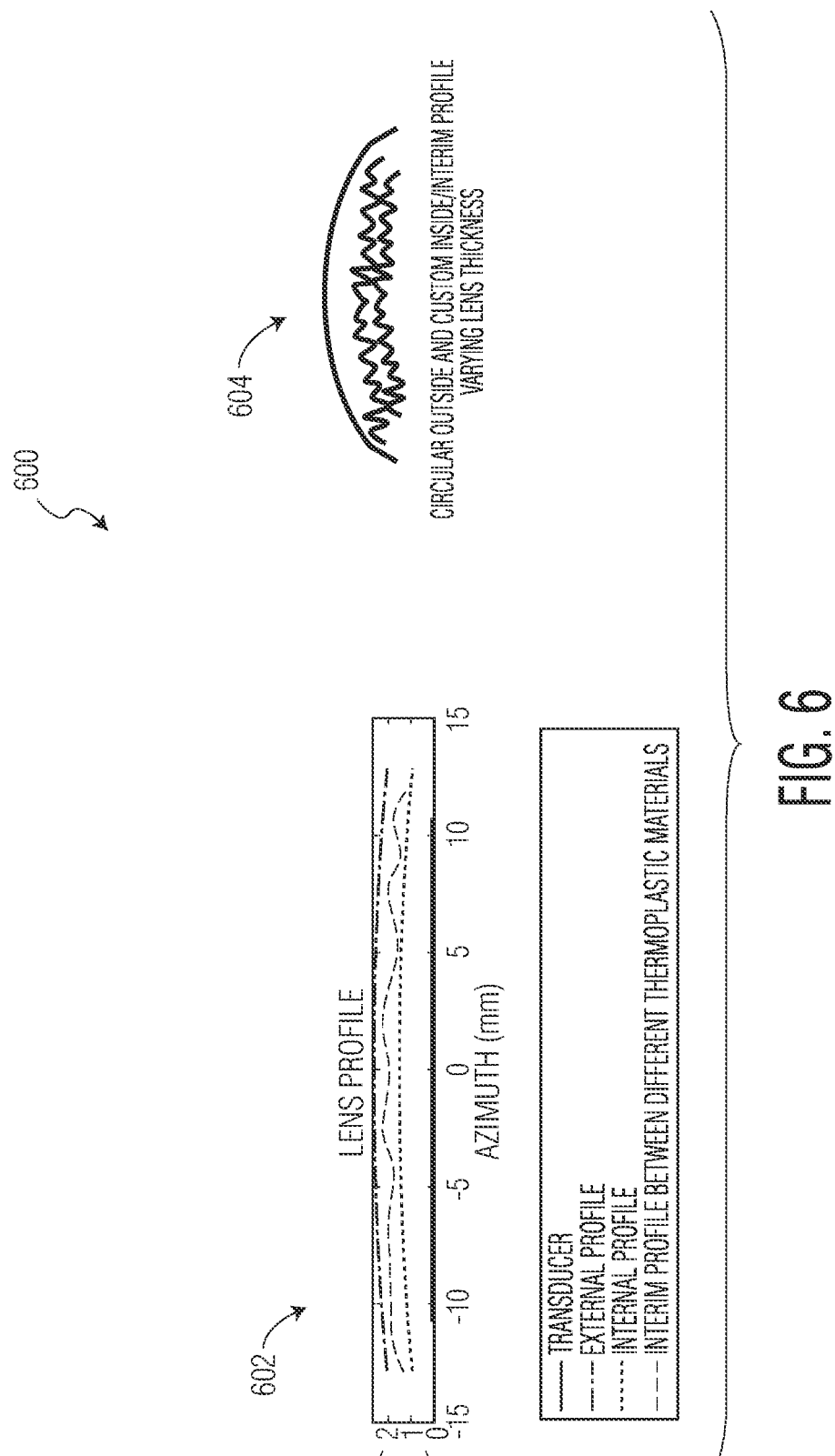
FIG. 6 shows a lens profile for an acoustic lens with an interim lens profile, according to an example embodiment of the present disclosure.

The embodiments described above teach varying the thickness of the acoustic lens, adding a texture to the surface of the acoustic lens or a combination of to achieve phase modulation of the received acoustic signals. Phase modulation may be achieved using other methods including combining two different materials to produce an interim profile between the inner/outer surfaces of a uniform thickness lens. For example, FIG. 6 shows a lens profile 600 for an acoustic lens 602 with an external profile, internal profile and interim profile. The interim profile may be achieved by mating an upper portion of the lens (portion between external profile and interim profile) with a lower portion of the lens (portion between the internal profile and interim profile). In other words, the upper portion of the lens is produced (e.g., molded) with a uniform external surface and an oscillating interim surface, while the lower portion of the lens is produced (e.g., molded) with a uniform internal surface and an oscillating interim surface that is complementary to the interim surface of the upper portion of the lens. This can be accomplished by molding the upper portion of the lens and then overmolding the lower portion of the lens onto the upper portion of the lens or vice versa. Another solution would be to mold the upper portion and lower portion separately and then laminate them together.

It is noted that the interim lens profile may also be accomplished by combining more than two layers of material (e.g., combining an upper layer, interim layer and lower layer of materials). It is also noted that this interim profile technique can also be used in combination with the techniques of varying the lens thickness and providing a texture in the inner lens surface as shown in 604. In either case, the resultant lens produces the desired phase modulation of the acoustic waves for attenuating reverberation.

The acoustic lens with an interim profile described above may be manufactured using various techniques including molding, layered lamination, 3D printing and the like. In one example, FIG. 7 shows flowchart 700 of manufacturing an acoustic lens with an interim profile for use in an ultrasound probe. In step 702, the lens material is injected into the mold to produce the first lens layer (e.g., upper layer). In step 704, the first lens layer is inserted into a mold where the second lens layer (e.g., interim layer) is injected into the mold. In step 706, the combined first/second lens layers are inserted into a mold where a third layer (e.g., internal layer) is injected into the mold. It is noted that in steps 704 and 706, the molded lens layers may be removed from their existing mold and placed into a new mold for each additional molding step, or the molded layers may stay within their existing mold which is repositioned to a new injection position for each additional molding step. It is noted that the step of creating the interim layer may be omitted when the upper layer and internal layer are made of different material and have respective interim complementary profiles that vary. In either case, in step 708 the molded lens is inserted and secured in the ultrasound probe.

As described above, the varying thickness and textured surfaces of the lenses introduce a time delay (i.e., phase modulation) to different portions of the acoustic waves such that the reverberation waves within the probe deconstructively combine. For example, FIG. 8 shows an example of a 2D transducer array 800 mounted below a lens (not shown) that introduces different time delays to the echoes. Specifically, the inner ring of transducer elements receive echoes with time delay T1, whereas outer ring of transducer elements receive echoes with greater time delay T2. These time delays may be achieved by a lens with first thickness near the center of the lens where the internal transducer elements are located, and a second greater thickness near the periphery of the lens where the external transducer elements are located.

Although this configuration provides improved reverberation attenuation, the phase modulation also modifies the information in the received echoes thereby distorting the constructed ultrasound image. In other words, artificial delays are added to the waves thereby misaligning portions of the waves upon reception. Thus, prior to constructing the ultrasound image, the software executed by the processor of computer 102 also compensates for the phase modulation to realign the portions of the echo waves.

Specifically, the profile of the lens may be known by computer 102. Therefore, the additional time delays introduced by the lens profile is also known. In other words, computer 102 knows that signals received from the inner ring of transducer elements are delayed by time T1, whereas signals received from the outer ring of transducer elements are delayed by a greater time T2. In order to compensate for the phase modulation, the difference in time ($\Delta T=T2-T1$) is computed to align the signals in time. For example, computer 102 may add delay $\Delta T$ to the signals received from the inner ring of transducer elements thereby synchronizing all of the transducer signals. This process is referred to as beamforming where the known relative differences in time delays due to the lens profile and/or lens surface texture are eliminated prior to image construction. In one example, as described above, these time delays may be known by computer 102 based on the identity of the lens utilized in the probe. In another example, when the delays are unknown, computer 102 may learn these delays over time using machine learning techniques or based on feedback from the technician. For example, the probe can be aimed at a target with constant density and distance to the probe. All of the received transducer signals should be synchronized if a uniform lens is utilized. However, since phase modulation is introduced in the lens, the relative phase offsets between these signals can be measured to determine the phase modulation behavior of the lens. This learned phase modulation behavior may then be used during operation as described above to align the transducer signals.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. An ultrasonic probe lens comprising:
   a lens body comprising a solid material extending outward from a center to a periphery;
   an inner surface of the lens body; and
   an outer surface of the lens body;
   wherein a thickness of the lens body as measured from the inner surface to the outer surface varies from the center to the periphery such that the lens body is configured with an inner optical profile and an outer optical profile to phase modulate ultrasonic waves incident upon the lens body to reduce reverberations, and
   wherein the outer surface of the lens body comprises a curved shape or a flat shape that varies the thickness of the lens body.

2. The ultrasonic probe lens of claim 1, wherein the inner surface of the lens body comprises a curved shape or a wedge shape that varies the thickness of the lens body.

3. The ultrasonic probe lens of claim 1, wherein the inner surface of the lens body comprises a custom shape that alternates between increasing and decreasing the thickness of the lens body.

4. The ultrasonic probe lens of claim 1, wherein the thickness of the lens body increases from the center to the periphery of the lens body.

5. The ultrasonic probe lens of claim 1, wherein the thickness of the lens body decreases from the center to the periphery of the lens body.

6. The ultrasonic probe lens of claim 1, wherein the lens body comprises dimensions from the center to the periphery to reduce the reverberations of the ultrasonic waves in a field of view of a 1-dimensional (1D) ultrasonic transducer.

7. The ultrasonic probe lens of claim 1, wherein the lens body comprises dimensions from the center to the periphery to reduce the reverberations of the ultrasonic waves in a field of view of a 2-dimensional (2D) ultrasonic transducer.

8. The ultrasonic probe lens of claim 1, wherein the inner surface of the lens body comprises a texture configured to reduce the reverberations of the ultrasonic waves.

9. The ultrasonic probe lens of claim 1, wherein the solid material between the inner surface of the lens body and the outer surface of the lens body is configured to produce an internal optical profile to reduce the reverberations of the ultrasonic waves.

10. An ultrasonic probe comprising:
    a lens body comprising a solid material extending outward from a center to a periphery; and
    a transducer configured to emit ultrasonic waves through the lens body, receive reflected ultrasonic waves through the lens body and convert the received reflected ultrasonic waves to electrical signals for further processing,
    wherein a thickness of the lens body as measured from an inner surface of the lens body to an outer surface of the lens body varies from the center to the periphery such that the lens body is configured with an inner optical profile and an outer optical profile to phase modulate the received reflected ultrasonic waves incident upon the lens body to reduce reverberations.

11. The ultrasonic probe of claim 10, wherein the outer surface of the lens body comprises a curved shape or a flat shape that varies the thickness of the lens body.

12. The ultrasonic probe of claim 10, wherein the inner surface of the lens body comprises a curved shape or a wedge shape that varies the thickness of the lens body.

13. The ultrasonic probe of claim 10, wherein the inner surface of the lens body comprises a custom shape that alternates between increasing and decreasing the thickness of the lens body.

14. The ultrasonic probe of claim 10, wherein the thickness of the lens body increases from the center to the periphery of the lens body.

15. The ultrasonic probe of claim 10, wherein the thickness of the lens body decreases from the center to the periphery of the lens body.

16. The ultrasonic probe of claim 10, wherein the lens body comprises dimensions from the center to the periphery to reduce the reverberations of the received reflected ultrasonic waves in a field of view of a 1-dimensional (1D) ultrasonic transducer or a 2-dimensional (2D) ultrasonic transducer.

17. The ultrasonic probe of claim 10, wherein the further processing includes processing the electrical signals to compensate for the phase modulation of the received reflected ultrasonic waves caused by the lens.

18. The ultrasonic probe of claim 10, wherein the inner surface of the lens body comprises a texture configured to reduce the reverberations of the received reflected ultrasonic waves.

19. The ultrasonic probe of claim 10, wherein the solid material between the inner surface of the lens body and the outer surface of the lens body is configured to produce an internal optical profile to reduce the reverberations of the received reflected ultrasonic waves.

* * * * *